Figure 5:
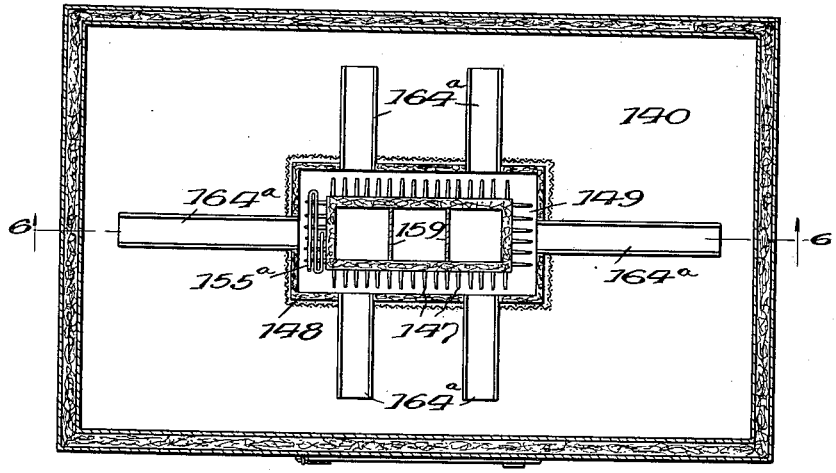

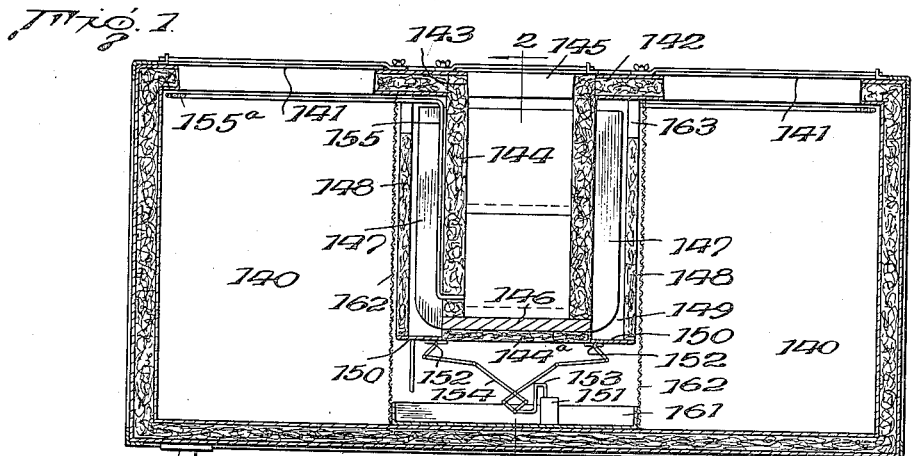
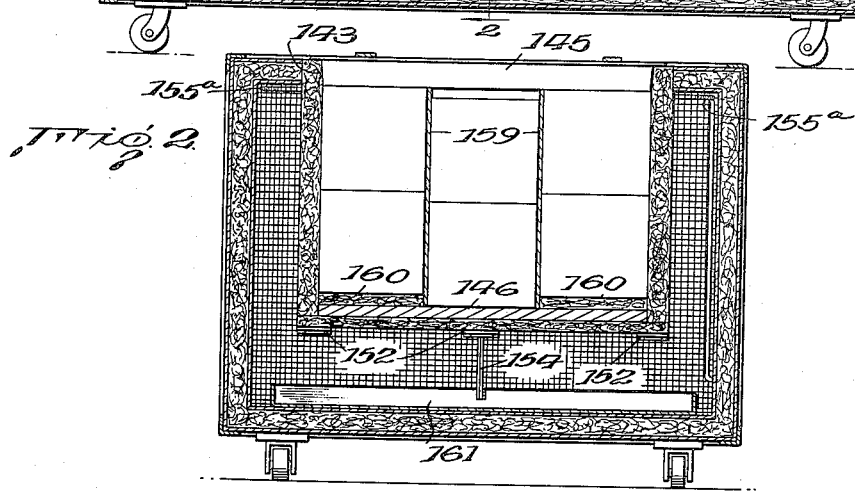
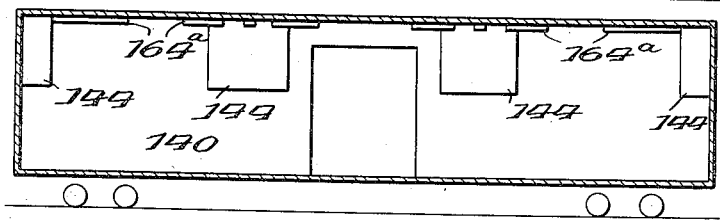
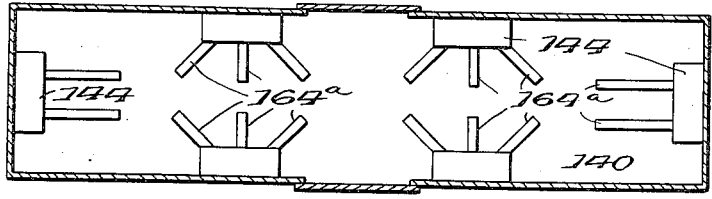

Dec. 29, 1936. E. RICE, JR 2,065,987
APPARATUS FOR REFRIGERATION
Original Filed July 14, 1930   3 Sheets-Sheet 2
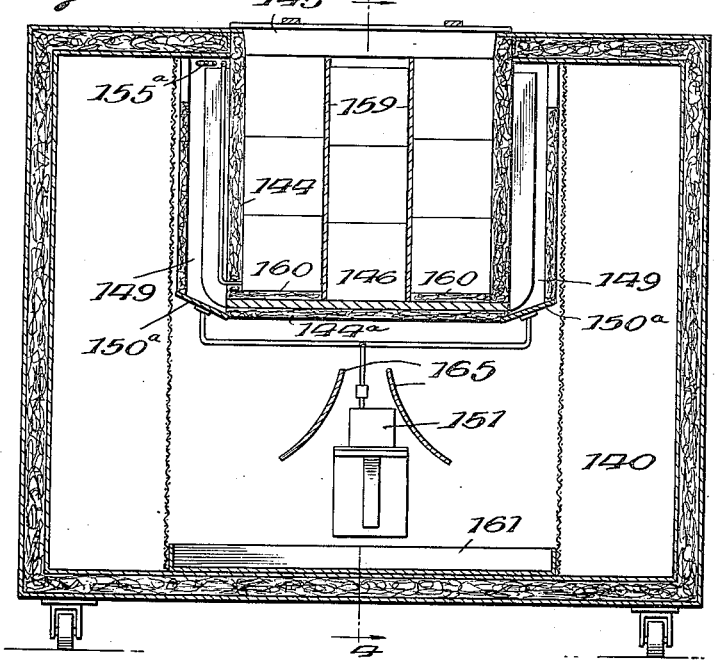
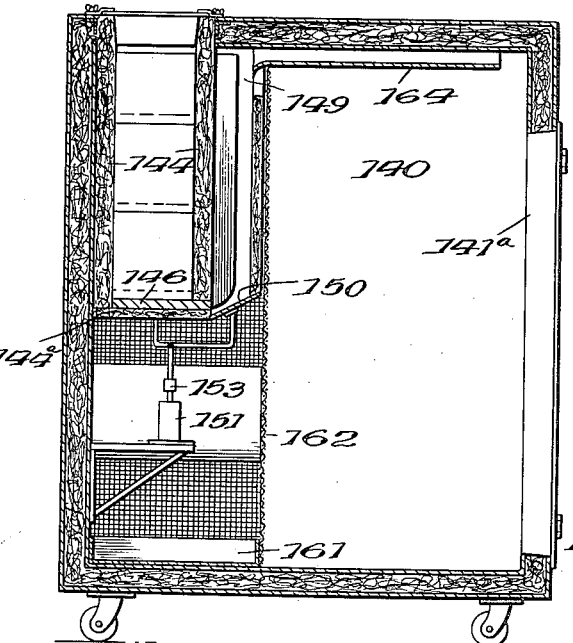
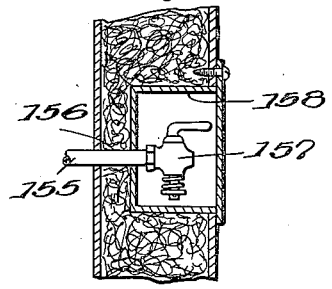
Inventor
Edward Rice, Jr., Dec. 29, 1936.   E. RICE, JR   2,065,987
APPARATUS FOR REFRIGERATION
Original Filed July 14, 1930   3 Sheets-Sheet 3

Inventor
Edward Rice, Jr.,

Patented Dec. 29, 1936

2,065,987

UNITED STATES PATENT OFFICE 2,065,987

APPARATUS FOR REFRIGERATION

Edward Rice, Jr., New York, N. Y., assignor to International Carbonic, Inc., New York, N. Y., a corporation of Delaware Original application July 14, 1930, Serial No. 467,999. Divided and this application July 3, 1936, Serial No. 88,878. In Canada August 5, 1930

13 Claims. (Cl. 62—91.5)

This invention relates to improvements in methods and means for refrigerating by use of solid refrigerants, such as water ice (solid $H_2O$), and carbon dioxide ice (solid $CO_2$).

A principal object of the invention is to provide a method of refrigerating by means of solid refrigerants that shall be more efficient than the prior methods and shall permit of close regulation of the effective refrigerating temperature.

Another object of the invention is to provide a method of refrigerating by means of solid refrigerants whereby the effective refrigerating temperatures are to a substantial degree independent of the volume of the refrigerant, and to this latter end, the invention contemplates the provision of a method for materially increasing the refrigerating efficiency of relatively small quantities of a solid refrigerant.

More specifically, an important object of the invention is the provision of a method of refrigeration by the use of a solid refrigerant which will produce effective refrigerating temperatures in the refrigerating chamber more closely approximating the melting or subliming temperature of the ice than the heretofore known methods, and which will maintain such temperatures even when the mass of ice has been reduced to relatively small dimensions.

Still another object of the invention is the provision of a method of refrigerating by use of solid refrigerants which will permit a rapid acceleration in the rate of ice meltage or sublimation irrespective of the volume of the refrigerant when the temperatures in the refrigerated area are increased.

A still further object of the invention is to provide a method of refrigeration by means of a solid refrigerant which will permit the refrigeration of practically any desired space whether occupied with a gas (including air), liquid, solid or a combination thereof without actual contact of the refrigerant with the contents of the space whereby when required the refrigerant may be entirely divorced from the refrigerated area.

A still further object of the invention is the provision of refrigerating apparatus for use with a solid refrigerant in which the principal heat transfer to the refrigerant takes place from the refrigerated space or mass to a conductor of high thermal conductivity and extended surface, and thence conductively to a relatively small surface of the refrigerant through a section of the conductor sufficiently large to transmit the required amount of heat for maintaining a predetermined effective refrigerating temperature.

The invention further contemplates the provision of refrigerating apparatus for use interchangeably with solid $CO_2$, solid $H_2O$ or other solid refrigerant, in which the principal heat transfer to the solid refrigerant takes place from the refrigerated area or mass to a conductor of high thermal conductivity and extended surface, thence conductively to a relatively small surface of the refrigerant through a section of the conductor of sufficient size to transmit an amount of heat required for maintaining a predetermined effective refrigerating temperature and in which differences in the melting or subliming temperatures of the different refrigerants may be compensated by means of variable conductor resistances placed between the conductor and the refrigerant.

Still more specifically, as regards the use of solid $H_2O$ and similar solid refrigerants of relatively high melting point, an object of the invention is to provide a novel method of refrigeration which will produce effective refrigerating temperatures more closely approximating the melting temperature of the ice than has heretofore been possible, and will maintain such temperatures even after the volume of the ice has been reduced to relatively small amounts.

Again specifically, and as regards the use of solid refrigerants, such as solid $CO_2$, having a relatively low melting point or point of sublimation, another object of the invention is to provide a method of refrigerating with such refrigerants which shall be both highly efficient and capable of close and accurate regulation of the effective refrigerating temperatures, said temperatures being maintainable even when the volume of the refrigerant has been reduced to relatively small amounts.

A still further object is the provision of refrigerating apparatus for use with solid $CO_2$ or the like in which the effective refrigerating temperature is controllable at least in part by means of insulation set up in an established principal path of heat travel between the refrigerated area or mass and the refrigerant.

A still further object of the invention is to provide a refrigerating apparatus for use with solid $CO_2$ or the like in which provision is made for varying the effective refrigerating temperature by means of an obstruction in the principal path of heat travel between the refrigerated area or mass and the refrigerant and in which said obstruction may be inserted, removed or varied either manually or thermostatically during the refrigerating operation.

A further and more specific object of the invention is the provision of a method of refrigeration by the use of carbon-dioxide "ice" or the like which will permit the automatic maintenance of an approximately constant temperature in the refrigerating chamber under varying conditions of outside atmospheric temperature, of content of refrigerating chamber, and of "ice" supply.

A further object of the invention is the provision of refrigerating apparatus for use with $CO_2$ "ice" or the like in which the principal heat transfer from the refrigerating chamber and its contents to the "ice" takes place convectively from the chamber to a conductor of high thermal conductivity, thence conductively to the "ice", and in which means may be provided for regulating the convection currents in such a manner that an approximately constant temperature may be maintained in the refrigerating chamber.

A further object of the invention is the provision of refrigerating apparatus for use with $CO_2$ "ice" or the like in which the gas resulting from sublimation of the "ice" is retained in essentially gas-tight channels away from the contents of the refrigerating chamber, and in which the gas escapes directly to the outside atmosphere or through piping of high thermal conductivity placed in the top of the refrigerating chamber, thus permitting a secondary heat transfer from the refrigerating chamber and its contents to the escaping $CO_2$ gas.

A further object of the invention is to provide a method of and apparatus for refrigerating by the use of $CO_2$ "ice" or the like whereby an initial rapid chilling of the refrigerating chamber or its contents may be had when desirable by a comparatively rapid melting or sublimation of the "ice", and thereafter the required temperature maintained by a much slower sublimation of the "ice" store.

A further object of the invention is the production of a refrigerating unit of such character that it may be employed either in household and stationary refrigerators or in the refrigeration of railways cars, motor truck bodies, or other transportation units.

Still another object of the invention is to provide simple and relatively inexpensive refrigerating units of a character adapted for use in household and other refrigerators employing solid $H_2O$ whereby my invention may be readily available for that class of refrigeration.

A still further object of the invention is to provide a refrigeration unit in which a wall is positioned adjacent the extended heat-absorbing surfaces to form an open-ended duct or ducts for directing the convection currents in the space to be refrigerated into contact with said extended surfaces, together with an open-ended auxiliary connecting duct or ducts which lead to parts of the space to be refrigerated remote from the extended heat-absorbing surfaces and which facilitate the flow of warmer air over said surfaces.

The invention will be described further in connection with the accompanying drawings in which—

Figure 6:
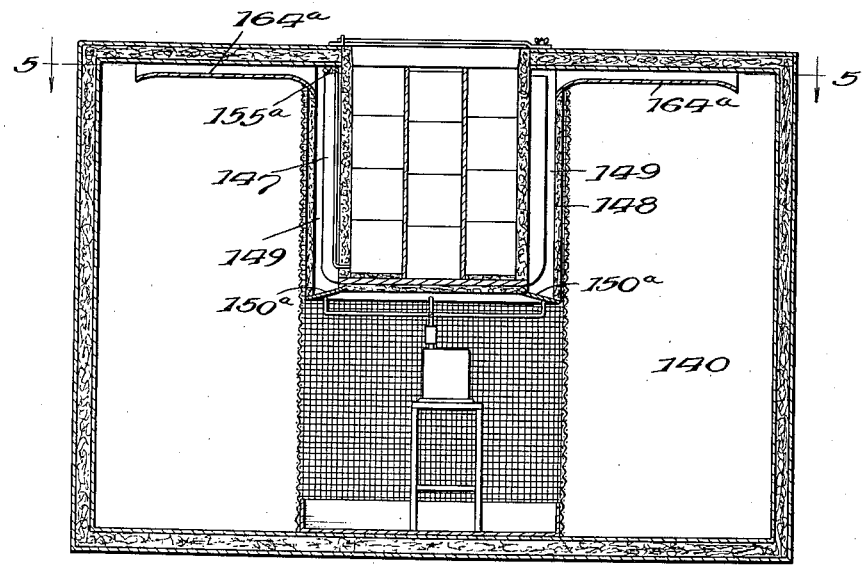

Fig. 1 is a vertical sectional view of a refrigerator embodying features of my invention, Fig. 2 is a vertical sectional view on line 2—2 of Fig. 1, Fig. 3 is a vertical sectional view of another refrigerator embodying my invention, Fig. 4 is a vertical sectional view on line 4—4 of Fig. 3, Fig. 5 is a horizontal sectional view of a further modification, the same being taken on line 5—5 of Fig. 6, Fig. 6 is a vertical sectional view taken on line 6—6 of Fig. 5, Fig. 7 is a semi-diagrammatic vertical sectional view through a refrigerator car equipped with refrigeration units constructed in accordance with my invention, Fig. 8 is a horizontal sectional view through the car shown in Fig. 7, and Fig. 9 is a detail sectional view illustrating the venting of the "ice" cabinet or storage chamber.

Water ice or solid $H_2O$ is more widely used than any other form of refrigerant. One of the principal drawbacks in the prior methods of using this refrigerant or, in fact, any solid refrigerant is that although any given mass of the refrigerant, no matter how small, has a fixed refrigerating value; yet the smaller the mass becomes, the slower its refrigerating action becomes also. This is due to the fact that the heat is usually either entirely or almost entirely brought to the ice convectively either by air or a liquid, and the amount of heat taken up by the refrigerant, other things being equal, depends directly on the amount of the effective surface contact between the refrigerant and the circulating fluid. Obviously as the ice melts, the surface area becomes less and the refrigerating action slower. In the construction of refrigerating apparatus, this feature, heretofore, has been given no consideration, and no effort has been made to compensate for the rapid decrease in efficiency as the refrigerant loses volume and surface area. As a result, a great deal of ice is constantly being used with very indifferent or inferior results.

One reason that the mechanical household refrigerator has progressed so rapidly is because the ordinary water ice refrigerator cannot maintain satisfactory refrigeration unless it is continually serviced and kept practically full of ice at all times. For the same reason, a large and growing field for refrigeration of foodstuffs in motor transportation has avoided the use of water ice and other solid refrigerants. Practically the only method attempted to improve the efficiency of water ice as a refrigerant has been the use of salt, a method of limited application which apparently cannot be greatly extended.

I have discovered that the principal obstacles to the efficient use of water ice and other solid refrigerants can be largely overcome if the heat from the space or material to be refrigerated is picked up by comparatively extended surfaces of a metal heat conductor, such as copper, aluminum or iron, and transferred through a substantial cross section of the metal conductor directly to a surface of the body of ice with which the metal conductor is either in immediate contact or in suitable conductive relation. I have found that by this method, the ice can be melted at practically a constant rate, thus providing a constant effective refrigerating temperature practically independent of the volume of the refrigerant, and even with extremely small masses of the latter. I have found also that the refrigerant can be melted at an almost inconceivable rate when large amounts of heat are passed over the extended metal surfaces. With a sufficient cross section of the conductor metal, as small as thirty square inches of contact surface with the refrigerant is sufficient to melt enough water ice to keep a good household refrigerator below 50° F. even on the top shelf in the warmest weather; and after the doors have been opened as long as three minutes, this refrigerator will return to its original low temperature within twenty minutes or one-half hour. It is essential in the practice of my invention that the solid refrigerant be maintained in conductive relation with a substantial metal conductor having a suitably extended surface area in the refrigerated space.

While the invention is of great importance in conjunction with the use of water ice, it is also of great value in the use of all other solid refrigerants, such as solid carbon dioxide and frozen brine. The apparatus embodying my invention need vary only slightly to meet the requirements of the particular kind of refrigerant and the type of refrigeration required. If, for example, refrigerating temperatures around 35° to 45° F. are desired and water ice is to be used by reason of its cheapness and availability, then a relatively large amount of extended conductor or fin surface will be required because of the small temperature differential between the water ice and the temperature required; while the same temperature can be secured by use of solid carbon dioxide with considerably less surface area by reason of the fact that with solid carbon dioxide the conductor can be chilled to almost any temperature required down to say minus 50° F., and accordingly a relatively large temperature differential be maintained between the conductor and the refrigerated space. Obviously if temperatures are wanted near or below the melting point of water ice, then some other solid refrigerant may be used with a sufficiently low melting or subliming point that the conductor can be put at a temperature affording the differential required to maintain the refrigeration wanted. Frozen brine may be used especialy when put up in small and easily handled units in liquid-tight metal containers. The heat transferred from the conductor to the solid brine through the metal container, however, is not as constant and controllable as in the direct contact of water ice with the conductor or the contact of carbon dioxide ice with the conductor through a known amount of conducting resistance, as hereinafter more specifically set forth. However, as the frozen brine can be provided with a melting point practically anywhere between 32° F. and considerably below zero and has now come into more common use and also is comparatively cheap, it is apparent that it will have a limited use as a solid refrigerant means in my method of refrigeration. Of course, frozen brine directly in solid state can be used in the same way as water ice or carbon dioxide ice by permitting the melted brine to drain off.

When using solid refrigerants such as carbon dioxide ice with a temperature considerably below the melting point of water ice, the use of predetermined known conductor resistances interposed between the conductor and the refrigerant is an important part of my method, as it affords a large degree of control over the action of the refrigerant and a quick convenient method of varying the temperature of the extended conductor surface, and thus the effective refrigerating temperature.

It will be understood that for maximum control of refrigeration, with this type of refrigerant it is desirable to limit so far as feasible transfer of heat from the refrigerated space or mass to that passing through the conductor. This can be accomplished by providing adequate insulation preventing transfer by radiation or by other than conduction through the selected conductor. By thus establishing a principal and practically sole path of transfer and utilizing in conjunction therewith suitable known resistances, a substantially perfect control may be obtained. This method of control also affords a simple method for providing apparatus suitable for use with refrigerants such as water ice and carbon dioxide ice having widely different melting points. Thus a single refrigerating apparatus can be built that can use as a refrigerant either carbon dioxide or water ice or frozen brine, or, in fact, any solid refrigerant, and that can maintain practically any required temperature under constant outside temperature conditions within the limits of the particular refrigerant used by a simple manipulation of conductor resistance interposed between the conductor and the refrigerant, and by providing in the same apparatus either manually or thermostatically-operated means to regulate the convection currents from the extended conductor surfaces or fins, the required temperature can be maintained irrespective of normal outside temperature variations.

In the form of the invention shown in Fig. 1, the numeral 140 designates a refrigerating chamber having access doors 141 in the upper wall 142 thereof. The chamber walls are, of course, insulated in any usual or preferred manner and the upper wall 142 has formed therein an opening 143. Extending into the refrigerating chamber through this opening is an insulated cabinet 144 approximately gas-tight having an open top closed by an access door 145. The bottom wall 144a of this cabinet has imposed thereon a conductor plate 146 which may be conveniently constructed from copper, aluminum or some other metal having a suitably high factor of thermal conductivity. The edges of this plate project through the cabinet walls and are provided with vertically-extending vanes 147 projecting upwardly along the side walls of the cabinet and preferably constructed integrally with the plate 146. These vanes may have either a plane surface, or be transversely or longitudinally corrugated, the latter constructions providing an increased surface for contact with convection currents.

Opposing the outer edges of the vanes are insulated walls 148 which combine with the cabinet to provide channels 149 through which convection currents may pass. The lower ends of these channels are closed by valves 150 regulated through a thermostat 151. In the present instance, the valves are illustrated as pivotally connected to the lower wall of the cabinet at 152 and connected to the movable element 153 of the thermostat by a linkage generally designated at 154.

From the interior of the cabinet a vent tube 155 is led through the wall of the refrigerating chamber 140 as at 156 (Fig. 9). This vent tube is made of metal of a high thermal conductivity, preferably copper, and includes a coil 155a disposed in chamber 140 for contact with the convection currents of the chamber, preferably near the top of the chamber and where warm "pockets" are liable to occur. The outlet of the vent tube is placed below the inlet in order to induce a ready flow of $CO_2$ gas by syphoning, and is preferably equipped with a regulating valve 157 which may be conveniently housed in a recess 158 formed in the wall of the cabinet.

The interior of the cabinet is preferably subdivided into a plurality of sections by vertically extending partitions 159 which may be constructed of insulating material. These partitions are in the present instance illustrated as two in number so that three "ice" spaces are formed. The bottoms of these "ice" spaces are formed by the plate 146 and upon the plate in the bottom of each "ice" space insulation 160 may be disposed between the "ice" and the plate, the thickness of this insulation varying in accordance with the conditions under which the refrigerator is to be employed. Insulation 160, the thickness of which may be varied, is removable and it will be obvious that if two of the compartments have in the bottoms thereof insulation 160 of a considerable thickness while the third compartment has no insulation as suggested in Fig. 1, or a relatively thin insulation as suggested in Fig. 6, the "ice" of this latter compartment will be sublimed more rapidly than that in the remaining compartments so that the "ice" of this compartment acts as an initial chilling supply while that of the remaining compartments acts as a reserve supply. Thus the first mentioned "ice" supply serves to rapidly reduce the temperature of the chamber when initially placed in operation or when a rapid reduction of temperature therein is necessary following an opening of the access doors 141.

If, for example, goods are placed in the refrigerator at their normal temperature and must be rapidly chilled, the insulation 160 may be completely removed from one of the compartments so that the "ice" in this compartment will act very rapidly to reduce the temperature of the chamber and to chill the goods to the desired point. The desired temperature having been attained, the "ice" in the remaining compartments is held in reserve to maintain this temperature thus materially increasing the period over which refrigeration is possible and particularly adapting the apparatus for use in transportation of perishable goods where facilities for replenishing the "ice" store are poor.

When pre-cooled products are placed in the refrigerating chamber, then the bottoms of all of the compartments may be provided with insulation thus providing a maximum period of refrigeration for a given "ice" supply. By varying the extent to which the bottoms of the compartments are insulated from conductor plate 146 a limited control of the rate of melting of the "ice" may be obtained and thereby a limited control of the temperature of the storage chamber and contents secured.

A drip pan 161 is preferably disposed beneath the cabinet for the reception of water resulting from defrosting of vanes 147 and the storage spaces of the refrigerating chamber are preferably separated from the cabinet spaces by foraminous screens 162.

The principal amount of the heat used in melting, or subliming the "ice" is transferred by convection from the storage chamber and its contents to the vertically extending vanes 147, thence conductively to the plate 146, thence conductively directly, or through insulation 160 to the "ice". A smaller amount of heat is transferred by conduction through the insulations of the "ice" cabinet and walls 148, and by internal convection currents within the "ice" cabinet and the space surrounding the vanes 147. Control of the temperature of the storage chamber and contents is secured in part by varying the size and character of the conduction plate 146 and vanes 147, and of the insulations 144, 144a, and 148, and the insulated chamber walls and doors. However, actual changes in temperature in the contents of the storage chamber during reduction to a desired level, as well as climatic and artificial changes in temperature outside the storage chamber may require a further means for securing a constant temperature inside the chamber. This is achieved by the thermostatic or manual control of the convection currents through channels 149 and transferring more or less heat to conduction vanes 147 and plate 146. By these several means a variation of the rate of subliming or melting the carbon dioxide "ice" of as much as 1,000% can be attained which I believe is sufficient to accomplish the objects of this invention.

The structure of Figs. 3 and 4 is substantially identical with that of Figs. 1 and 2, with the exception of the fact that the chamber 140 has its access door 141a mounted in the side wall thereof and that communication between the channels 149 and the storage space in the upper ends of these channels instead of being made only through openings 163, formed in the insulating walls, includes one or more ducts 164 opening at the inner end through the wall of channel 149 and having the outer end disposed adjacent to the wall of the chamber 140 or where warm pockets are likely to occur. A further slight modification of the control of the channel is employed in that the valves 150a instead of being supported by the cabinet, as in Figs. 1 and 2, are directly supported from and secured to the movable member 153 of the thermostat. The thermostat has further associated therewith baffle shields 165 which prevent chilled air, descending from the convection channels, from directly contacting thermostat 151 and thus causing too early a closing operation of the valves 150a.

The form shown in Figs. 5 and 6 is identical with the structure of Figs. 3 and 4, with the exception of the fact that conduction vanes are provided entirely about the cabinet walls and entrance to the convection channels is largely through ducts 164a, the intake ends of which are disposed adjacent to the vertical walls of the chamber 140.

Units of the character shown are particularly adapted for use in conjunction with refrigerating cars, as diagrammatically illustrated in Figs. 7 and 8. As shown in these figures, a plurality of units will be employed arranged about the side walls of the car and immediately beneath the top thereof. The ducts 164 are in each instance projected toward the center of the car, so that the intake will be from the highest, and accordingly, the warmest part thereof.

This application is a division of my application for Method and apparatus for refrigeration, Serial No. 467,999, filed June 14, 1930, now Patent No. 2,055,158, which application in turn was filed as a continuation-in-part of my application for Method of refrigeration by means of solid carbon dioxide, Serial No. 372,754, filed June 21, 1929.

I claim:—

1. In refrigerating apparatus for cooling by a solid refrigerant such as water-ice, brine-ice, or solid carbon dioxide, a solid metallic heating conductor having a vertically positioned extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat-absorbing surface at an effective refrigerating temperature lower than that of the space or material to be cooled, whereby said heat-absorbing surface is adapted to absorb a larger amount of the heat to be transmitted by said conductor, together with a wall cooperating with said extended heat absorbing surface to form a generally vertically-extending duct through which air may flow from the space to be cooled into contact with said extended surface, and a horizontally-extending duct connected with an upper portion of said vertically-extending duct for facilitating the flow of warmer air over said extended surface from portions of the space to be cooled remote from said surface.

2. In refrigerating apparatus for cooling by a solid refrigerant such as water-ice, brine-ice, or solid carbon dioxide, a solid metallic heating conductor having a vertically positioned extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat-absorbing surface at an effective refrigerating temperature lower than that of the space or material to be cooled, whereby said heat-absorbing surface is adapted to absorb a larger amount of the heat to be transmitted by said conductor, together with a wall cooperating with said extended heat absorbing surface to form a duct through which air may flow from the space to be cooled into contact with said extended surface, and a duct extended in the upper part of the space to be cooled and communicating with the duct formed adjacent to said heat-absorbing conductor surface, said extended duct facilitating the flow of warmer air over the heat-absorbing surface from portions of the space to be cooled remote from said surface.

3. In refrigerating apparatus for cooling by a solid refrigerant such as water-ice, brine-ice, or solid carbon dioxide, a solid metallic heating conductor having a vertically positioned extended surface in the form of fins for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat absorbing surface at an effective refrigerating temperature lower than that of the space or material to be cooled, whereby said heat-absorbing surface is adapted to absorb a larger amount of the heat to be transmitted by said conductor, together with a wall cooperating with said extended heat absorbing surface to form a duct through which air may flow from the space to be cooled into contact with said extended surfaces, and a duct extended in the upper part of the space to be cooled and communicating with the duct formed adjacent to said heat-absorbing conductor surface, said extended duct facilitating the flow of warmer air over the heat-absorbing surface from portions of the space to be cooled remote from said surface.

4. In refrigerating apparatus for cooling by a solid refrigerant such as water-ice, brine-ice, or solid carbon dioxide, a solid metallic heat conductor having a generally horizontally extending portion for supporting solid refrigerant in heat conductive relation therewith, said conductor also having a vertically positioned extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat-absorbing surface at an effective refrigerating temperature lower than that of the space or material to be cooled, whereby said heat-absorbing surface is adapted to absorb a larger amount of heat to be transmitted by said conductor, together with a wall cooperating with said extended heat absorbing surface to form a duct through which air may flow from the space to be cooled into contact with said extended surface, and a duct extended in the upper part of the space to be cooled and communicating with the duct formed adjacent to said heat-absorbing conductor surface, said extended duct facilitating the flow of warmer air over the heat-absorbing surface from portions of the space to be cooled remote from said surface.

5. In refrigerating apparatus for cooling by a solid refrigerant such as water-ice, brine-ice, or solid carbon dioxide, a solid metallic heat conductor having a generally horizontally extending portion for supporting solid refrigerant in heat conductive relation therewith, said conductor also having a vertically positioned extended surface in the form of fins for heat absorption from the space or material to be cooled of a greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat-absorbing surface at an effective refrigerating temperature lower than that of the space or material to be cooled, whereby said heat-absorbing surface is adapted to absorb a larger amount of the heat to be transmitted by said conductor, together with a wall cooperating with said extended heat absorbing surface to form a duct through which air may flow from the space to be cooled into contact with said extended surface, and a duct extended in the upper part of the space to be cooled and communicating with the duct formed adjacent to said heat-absorbing conductor surface, said extended duct facilitating the flow of warmer air over the heat-absorbing surface from portions of the space to be cooled remote from said surface.

6. In refrigerating apparatus for cooling by a solid refrigerant such as water-ice, brine-ice, or solid carbon dioxide, a solid metallic heat conductor having a vertically positioned extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat-absorbing surface at an effective refrigerating temperature lower than that of the space or material to be cooled, whereby said heat-absorbing surface is adapted to absorb a larger amount of the heat to be transmitted by said conductor, together with a wall cooperating with said extended heat absorbing surface to form a generally vertically-extending duct through which air may flow from the space to be cooled into contact with said extended surface, a horizontally-extending duct connected with an upper portion of said vertically-extending duct for facilitating the flow of warmer air over said extended surface from portions of the space to be cooled remote from said surface, and means for retarding the flow of air through the duct formed adjacent to said heat-absorbing conductor surface.

7. In refrigerating apparatus for cooling by a solid refrigerant such as water-ice, brine-ice, or solid carbon dioxide, a solid metallic heat conductor having a vertically positioned extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat-absorbing surface at an effective refrigerating temperature lower than that of the space or material to be cooled, whereby said heat-absorbing surface is adapted to absorb a larger amount of the heat to be transmitted by said conductor, together with a wall cooperating with said extended heat absorbing surface to form a generally vertically-extending duct through which air may flow from the space to be cooled into contact with said extended surface, a horizontally-extending duct connected with an upper portion of said vertically-extending duct for facilitating the flow of warmer air over said extended surface from portions of the space to be cooled remote from said surface, and means for controlling the flow of air through the duct formed adjacent to said heat-absorbing conductor surface.

8. In refrigerating apparatus for cooling by a solid refrigerant such as water-ice, brine-ice, or solid carbon dioxide, a solid metallic heat conductor having a vertically-positioned extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat-absorbing surface at an effective refrigerating temperature lower than that of the space or material to be cooled, whereby said heat-absorbing surface is adapted to absorb a larger amount of the heat to be transmitted by said conductor, together with a wall cooperating with said extended heat absorbing surface to form a generally vertically-extending duct through which air may flow from the space to be cooled into contact with said extended surface, a horizontally-extending duct connected with an upper portion of said vertically-extending duct for facilitating the flow of warmer air over said extended surface from portions of the space to be cooled remote from said surface, and thermostatic means for regulating the flow of air through the duct formed adjacent to said heat-absorbing conducting surface in accordance with the temperature in the space to be cooled.

9. In refrigerating apparatus for cooling by a solid refrigerant such as solid carbon dioxide, a closed chamber for the refrigerant, a portion of said chamber including a solid metallic heat conductor in heat exchange relation to refrigerant therein and having an extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat absorbing surface at an effective refrigerating temperature lower than that of the space or material to be cooled, whereby said heat absorbing surface is adapted to absorb a larger amount of the heat to be transmitted by said conductor, a gas escape pipe leading from the refrigerant chamber to the outside of the refrigerating apparatus, and means operable from without the chamber for permitting escape of some gas generated by the evaporation or sublimation of the refrigerant.

10. In refrigerating apparatus for cooling by a solid refrigerant such as solid carbon dioxide, a closed chamber for the refrigerant, a portion of said chamber including a solid metallic heat conductor in heat exchange relation to refrigerant therein and having an extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat absorbing surface at an effective refrigerating temperature lower than that of the space or material to be cooled, whereby said heat absorbing surface is adapted to absorb a larger amount of the heat to be transmitted by said conductor, a gas escape pipe leading from the refrigerant chamber to the outside of the refrigerating apparatus, and a valve in said pipe and operable from without the chamber for regulating the escape of gas generated by the evaporation or sublimation of the refrigerant.

11. In refrigerating apparatus for cooling by a solid refrigerant such as solid carbon dioxide, a closed chamber for the refrigerant, a portion of said chamber including a solid metallic heat conductor in heat exchange relation to refrigerant therein and having an extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat absorbing surface at an effective refrigerating temperature lower than that of the space or material to be cooled, whereby said heat absorbing surface is adapted to absorb a larger amount of the heat to be transmitted by said conductor, a gas escape pipe leading from the refrigerant conductor to the outside of the refrigerating apparatus, said gas pipe extending through a portion of the space to be refrigerated and in heat conductive relation therewith, and a valve in said pipe and operable from without the chamber for controlling the passage of gas therethrough.

12. In refrigerating apparatus for cooling by a solid refrigerant such as solid carbon dioxide, a closed chamber for the refrigerant, a portion of said chamber including a solid metallic heat conductor in heat exchange relation to refrigerant therein and having an extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat absorbing surface at an effective refrigerating temperature lower than that of the space or material to be cooled, a wall cooperating with said extended heat-absorbing surface to form a duct through which air may flow from the space to be cooled into contact with said extended surface, a duct extended in the upper part of the space to be cooled and communicating with the duct formed adjacent to said heat-absorbing conductor surface, said extended duct facilitating flow of warmer air over the heat absorbing surface from portions of the space to be cooled remote from said surface, a gas escape pipe leading from the refrigerant chamber to the outside of the refrigerating apparatus, and means operable from without said chamber for controlling the escape of gas through said pipe.

13. In refrigerating apparatus for cooling by a solid refrigerant such as water-ice, brine-ice, or solid carbon dioxide, a solid metallic heat conductor having a vertically positioned extended surface for heat absorption from the space or material to be cooled of greater area than the surface of the conductor presented in the refrigerant-containing chamber for heat transfer to the refrigerant, the capacity of said conductor to transmit heat along in the direction of the refrigerant from the said surface presented for heat absorption being sufficient, by reason of its thickness with respect to the heat conductivity of the metal from which it is formed and the area of said extended surface exposed for heat absorption, to maintain said heat-absorbing surface at an effective refrigerating temperture lower than that of the space or material to be cooled, whereby said heat-absorbing surface is adapted to absorb a larger amount of the heat to be transmitted by said conductor, together with a horizontally-extending duct for facilitating the flow of warmer air over said vertically-extended surface from portions of the space to be cooled remote from said surface.

EDWARD RICE, Jr.